United States Patent
Bales et al.

(10) Patent No.: US 12,445,169 B2
(45) Date of Patent: Oct. 14, 2025

(54) AMBIENT ELECTROMAGNETIC POWER HARVESTING DEVICE FOR COLLECTING AND FORWARDING DATA

(71) Applicant: T-Mobile Innovations LLC, Overland Park, KS (US)

(72) Inventors: Mark R. Bales, Lee's Summit, MO (US); Lyle Bertz, Lee's Summit, MO (US); Robert Keith Butler, Overland Park, KS (US); Lyle W. Paczkowski, Mission Hills, KS (US)

(73) Assignee: T-Mobile Innovations LLC, Overland Park, KS (US)

(*) Notice: Subject to any disclaimer, the term of this patent is extended or adjusted under 35 U.S.C. 154(b) by 272 days.

(21) Appl. No.: 18/325,936

(22) Filed: May 30, 2023

(65) Prior Publication Data

US 2024/0405803 A1    Dec. 5, 2024

(51) Int. Cl.
*H04B 5/77* (2024.01)

(52) U.S. Cl.
CPC ..................... *H04B 5/77* (2024.01)

(58) Field of Classification Search
CPC ........... G06K 17/0022; G06K 17/0029; G06K 19/0709; G06K 7/10178; G06K 7/10188; H02J 50/001; H02J 50/20; H04B 5/77
See application file for complete search history.

(56) References Cited

U.S. PATENT DOCUMENTS

| | | | |
|---|---|---|---|
| 6,882,128 B1 | 4/2005 | Rahmel et al. | |
| 7,986,935 B1 | 7/2011 | D'Souza et al. | |
| 8,204,794 B1 | 6/2012 | Peng et al. | |
| 8,593,256 B2 | 11/2013 | Isabell | |
| 9,411,992 B1 | 8/2016 | Marek et al. | |

(Continued)

FOREIGN PATENT DOCUMENTS

| | | |
|---|---|---|
| EP | 2679503 A2 | 1/2014 |
| EP | 3875981 A2 | 9/2021 |

(Continued)

OTHER PUBLICATIONS

Restriction Requirement dated Apr. 1, 2025, U.S. Appl. No. 18/295,075, filed Apr. 3, 2023.

(Continued)

*Primary Examiner* — Omer S Khan

(57) ABSTRACT

A collector ambient electromagnetic power harvesting (AEPH) device for collecting and forwarding data is disclosed. The device includes an antenna, an AEPH circuit converting RF energy from the antenna into electrical power, and a memory and a controller powered by the AEPH circuit. The controller receives in a first RF signal information from a reporter AEPH device, including data and the reporter ID. The controller stores the data in the memory with an association to the reporter ID. The controller receives in a second RF signal an interrogation signal. In response, the controller transmits a response via the antenna including the reporter ID and data in the memory associated with the reporter ID. The interrogation signal may be received and the response transmitted in a first RF band and/or communication protocol, and the information may be received in a second RF band and/or communication protocol.

18 Claims, 6 Drawing Sheets

(56) References Cited

U.S. PATENT DOCUMENTS

| | | |
|---|---|---|
| 9,894,471 B1 | 2/2018 | Zalewski et al. |
| 10,676,240 B2 | 6/2020 | Logunov et al. |
| 10,922,939 B1 | 2/2021 | Shakedd et al. |
| 10,938,449 B1 | 3/2021 | Loman et al. |
| 11,213,773 B2 | 1/2022 | Okoro et al. |
| 11,238,324 B1 | 2/2022 | Marquardt et al. |
| 11,258,302 B1 | 2/2022 | Marquardt et al. |
| 11,704,528 B2 | 7/2023 | Marquardt et al. |
| 11,714,985 B1 | 8/2023 | Bales et al. |
| 11,757,305 B2 | 9/2023 | Marquardt et al. |
| 11,900,198 B2 | 2/2024 | Marquardt et al. |
| 11,924,908 B1 | 3/2024 | Paczkowski et al. |
| 11,946,766 B1 | 4/2024 | Volkerink et al. |
| 12,073,417 B2 | 8/2024 | Chen |
| 12,155,423 B1 | 11/2024 | Loman et al. |
| 12,164,987 B2 | 12/2024 | Bales et al. |
| 12,197,983 B2 | 1/2025 | Marquardt et al. |
| 12,229,610 B2 | 2/2025 | Bales et al. |
| 2004/0155778 A1 | 8/2004 | Shek et al. |
| 2005/0151617 A1 | 7/2005 | Nakazawa |
| 2006/0071925 A1 | 4/2006 | Wykoff et al. |
| 2006/0134580 A1 | 6/2006 | Raby et al. |
| 2007/0085688 A1 | 4/2007 | Zhu et al. |
| 2007/0205902 A1 | 9/2007 | Cote et al. |
| 2008/0018467 A1 | 1/2008 | Estevez et al. |
| 2008/0126111 A1 | 5/2008 | Loda |
| 2008/0129457 A1 | 6/2008 | Ritter et al. |
| 2009/0096574 A1 | 4/2009 | Oberle |
| 2009/0315686 A1 | 12/2009 | Oberle |
| 2010/0090004 A1 | 4/2010 | Sands et al. |
| 2010/0102123 A1 | 4/2010 | Skowronek |
| 2011/0181399 A1 | 7/2011 | Pollack et al. |
| 2012/0018505 A1 | 1/2012 | Jiang et al. |
| 2012/0105210 A1 | 5/2012 | Smith et al. |
| 2012/0126945 A1* | 5/2012 | Kim ................ G06K 7/10188 340/10.1 |
| 2012/0149300 A1 | 6/2012 | Forster |
| 2013/0084796 A1 | 4/2013 | Kerr |
| 2013/0320079 A1 | 12/2013 | Nordin et al. |
| 2014/0134468 A1 | 5/2014 | Schaefer et al. |
| 2015/0048682 A1 | 2/2015 | Murley |
| 2015/0069126 A1 | 3/2015 | Leon |
| 2017/0093896 A1 | 3/2017 | Poornachandran et al. |
| 2017/0270323 A1 | 9/2017 | Butler et al. |
| 2017/0364720 A1 | 12/2017 | Kantor et al. |
| 2019/0034672 A1 | 1/2019 | Rokhsaz |
| 2019/0121576 A1 | 4/2019 | Jean |
| 2019/0138870 A1 | 5/2019 | Kuzbari et al. |
| 2019/0149725 A1 | 5/2019 | Adato et al. |
| 2019/0285724 A1 | 9/2019 | Meadow |
| 2019/0347454 A1 | 11/2019 | Mongrenier et al. |
| 2019/0354824 A1 | 11/2019 | Mohiuddin et al. |
| 2020/0004999 A1 | 1/2020 | Kawaguchi et al. |
| 2020/0180935 A1 | 6/2020 | Zumtobel et al. |
| 2020/0219112 A1 | 7/2020 | Nakayma et al. |
| 2020/0227813 A1 | 7/2020 | Yehezkely |
| 2020/0265446 A1 | 8/2020 | Vargas |
| 2021/0019482 A1 | 1/2021 | Shakedd et al. |
| 2021/0019585 A1 | 1/2021 | Shakedd et al. |
| 2021/0027587 A1 | 1/2021 | Yeh et al. |
| 2021/0126623 A1 | 4/2021 | Jeong |
| 2021/0142013 A1 | 5/2021 | Kumar et al. |
| 2021/0203496 A1 | 7/2021 | Cariello et al. |
| 2021/0219102 A1 | 7/2021 | Gion et al. |
| 2021/0224727 A1 | 7/2021 | Rakhunde et al. |
| 2021/0280307 A1 | 9/2021 | Hargrove et al. |
| 2021/0342559 A1 | 11/2021 | Frederick |
| 2022/0043990 A1 | 2/2022 | Pandey et al. |
| 2022/0109667 A1 | 4/2022 | Gorog |
| 2022/0121894 A1* | 4/2022 | Marquardt ......... G06K 19/0709 |
| 2022/0171051 A1* | 6/2022 | Cristache .............. G01S 13/876 |
| 2022/0180141 A1 | 6/2022 | Marquardt et al. |
| 2022/0331841 A1 | 10/2022 | Filler et al. |
| 2022/0344971 A1 | 10/2022 | Marquardt et al. |
| 2022/0374030 A1 | 11/2022 | Lehtonen et al. |
| 2022/0374621 A1 | 11/2022 | Biswas et al. |
| 2023/0140778 A1 | 5/2023 | Abotabi et al. |
| 2023/0187811 A1 | 6/2023 | Cohen et al. |
| 2023/0306224 A1 | 9/2023 | Marquardt et al. |
| 2023/0351406 A1 | 11/2023 | Marquardt et al. |
| 2023/0359982 A1 | 11/2023 | Mohseni |
| 2024/0015661 A1 | 1/2024 | Wang et al. |
| 2024/0020502 A1 | 1/2024 | Marquardt et al. |
| 2024/0047993 A1 | 2/2024 | Paczkowski et al. |
| 2024/0047994 A1 | 2/2024 | Paczkowski et al. |
| 2024/0088957 A1 | 3/2024 | Wang et al. |
| 2024/0127022 A1 | 4/2024 | Marquardt et al. |
| 2024/0265226 A1 | 8/2024 | Bales et al. |
| 2024/0273313 A1 | 8/2024 | Wang et al. |
| 2024/0330615 A1 | 10/2024 | Balmakhtar et al. |
| 2024/0339867 A1 | 10/2024 | Balmakhtar et al. |
| 2024/0364145 A1 | 10/2024 | Balmakhtar et al. |
| 2024/0394723 A1 | 11/2024 | Chen |
| 2025/0053769 A1 | 2/2025 | Bales et al. |
| 2025/0094757 A1 | 3/2025 | Marquardt et al. |
| 2025/0148249 A1 | 5/2025 | Bales et al. |

FOREIGN PATENT DOCUMENTS

| | | |
|---|---|---|
| EP | 4172863 A1 | 5/2023 |
| EP | 4205031 A1 | 7/2023 |
| EP | 4278425 A1 | 11/2023 |
| EP | 4429076 A1 | 9/2024 |
| EP | 4443327 A1 | 10/2024 |
| EP | 4446939 A1 | 10/2024 |
| EP | 4455934 A1 | 10/2024 |
| EP | 4471660 A1 | 12/2024 |
| EP | 4519805 | 3/2025 |
| EP | 4537240 | 4/2025 |
| WO | 2008051598 A1 | 5/2008 |
| WO | 2008055212 A2 | 5/2008 |
| WO | 20110160007 A2 | 12/2011 |
| WO | 2015187199 A1 | 12/2015 |
| WO | 2018063449 A1 | 4/2018 |
| WO | 2018132120 A1 | 7/2018 |
| WO | 20190149341 A1 | 8/2019 |
| WO | 20200208412 A1 | 10/2020 |
| WO | 2022060475 A1 | 3/2022 |
| WO | 2022125162 A1 | 6/2022 |
| WO | 2022231682 A1 | 11/2022 |
| WO | 20220268331 A1 | 12/2022 |
| WO | 20240167584 A1 | 8/2024 |

OTHER PUBLICATIONS

Marquardt, Ronald, R., et al., "RFID Device with Two-Stage Power Harvesting," filed Dec. 3, 2024 U.S. Appl. No. 18/967,600.

Bales, Mark, R., et al., "System and Method of Controlling Lifecycles of Ambient Electromagnetic Power Harvesting Chips," filed Jan. 10, 2025, U.S. Appl. No. 19/017,214.

Office Action dated Sep. 14, 2023, U.S. Appl. No. 17/161,415, filed Jan. 28, 2021.

Notice of Allowance dated Sep. 27, 2023, U.S. Appl. No. 17/115,596, filed Dec. 8, 2020.

Foreign Communication From a Related Counterpart Application, International Search Report and Written Opinion dated Sep. 26, 2023, International Application No. PCT/US2023/067789.

Foreign Communication From a Related Counterpart Application, EP Extended Search Report and EP Search Opinion dated Aug. 16, 2024, EP Application No. 24165554.7.

Foreign Communication From a Related Counterpart Application, EP Extended Search Report and EP Search Opinion dated Sep. 2, 2024, EP Application No. 24165153.8.

Foreign Communication From a Related Counterpart Application, EP Extended Search Report and EP Search Opinion dated Sep. 18, 2024, EP Application No. 24169545.1.

Foreign Communication From a Related Counterpart Application, EP Extended Search Report and EP Search Opinion dated Oct. 15, 2024, EP Application No. 24175267.4.

Bales, Mark R., et al., "System and Method of Controlling Unique Identities of Ambient Electromagnetic Power Harvesting Chips," filed Oct. 28, 2024, U.S. Appl. No. 18/929,569.

(56) References Cited

OTHER PUBLICATIONS

Balmakhtar, Marouane, et al., "Location Detection and Tracking Using Ambient Electromagnetic Power Harvesting," filed Apr. 25, 2023, U.S. Appl. No. 18/306,934.
Notice of Allowance dated Oct. 15, 2024, U.S. Appl. No. 17/165,877, filed Feb. 7, 2023.
Notice of Allowance dated Sep. 13, 2024, U.S. Appl. No. 18/323,268, filed May 24, 2023.
Office Action dated Jan. 8, 2024, U.S. Appl. No. 17/734,555, filed May 2, 2022.
Final Office Action dated Apr. 1, 2024, U.S. Appl. No. 17/161,415, filed Jan. 28, 2021.
Office Action dated Apr. 8, 2024, U.S. Appl. No. 17/165,877, filed Feb. 7, 2023.
Tahir, M., et al. "An Approach for Managing Manufacturing Assets through Radio Frequency Energy Harvesting". Future and Automation Systems and Technologies Laboratory, Jan. 2019.
Notice of Allowance dated Apr. 19, 2024, U.S. Appl. No. 17/734,555, filed May 2, 2022.
Office Action dated Apr. 30, 2020, U.S. Appl. No. 16/158,299, filed Oct. 12, 2018.
Notice of Allowance dated Oct. 30, 2020, U.S. Appl. No. 16/158,299, filed Oct. 12, 2018.
Notice of Allowance dated Oct. 5, 2021, U.S. Appl. No. 17/024,484, filed Sep. 17, 2020.
Notice of Allowance dated Oct. 21, 2021, U.S. Appl. No. 17/240,846, filed Apr. 26, 2021.
Notice of Allowance dated Mar. 7, 2023, U.S. Appl. No. 17/568,019, filed Jan. 4, 2022.
Notice of Allowance dated May 3, 2023, U.S. Appl. No. 17/867,218, filed Jul. 18, 2022.
Office Action dated May 11, 2023, U.S. Appl. No. 17/161,415, filed Jan. 28, 2021.
Office Action dated Jun. 20, 2023, U.S. Appl. No. 17/115,596, filed Dec. 8, 2020.
Notice of Allowance dated May 11, 2023, U.S. Appl. No. 17/571,294, filed Jan. 7, 2022.
Foreign Communication From a Related Counterpart Application, International Search Report and Written Opinion dated Nov. 23, 2021, International Application No. PCT/US2021/044086 filed on Jul. 31, 2021.
Foreign Communication From a Related Counterpart Application, International Search Report and Written Opinion dated Dec. 6, 2021, International Application No. PCT/US2021/051159 filed on Sep. 20, 2021.
Foreign Communication From a Related Counterpart Application, Invitiation to Pay Additional Fees dated May 30, 2022, International Application No. PCT/US2022/017304.
Foreign Communication From a Related Counterpart Application, International Search Report and Written Opinion dated Jul. 21, 2022, International Application No. PCT/US2022/017304.
Foreign Communication From a Related Counterpart Application, International Search Report and Written Opinion dated May 3, 2023, International Application No. PCT/US2023/014517.
Loman, Clinton H., et al., "Battery Coupled Radio Frequency Identity (RFID)," filed Jan. 28, 2021, U.S. Appl. No. 17/161,415.
Marquardt, Ronald, R., et al., "Multi-tier Identities in an RFID Chip," filed Dec. 8, 2020, U.S. Appl. No. 17/115,596.
Marquardt, Ronald, R., et al., "RFID Device with Two-Stage Power Harvesting," filed Jul. 31, 2021, International Application No. PCT/US2021/044086.
Marquardt, Ronald, R., et al., "Multi-tier Identities in an RFID Chip," filed Sep. 20, 2021, International Application No. PCT/US2021/051159.
Marquardt, Ronald, R., et al., "Ambient Electromagnetic Power Harvesting Chip Adaptation Based on Available Power Level," filed Jan. 7, 2022, U.S. Appl. No. 17/571,294.
Marquardt, Ronald, R., et al., "Ambient Electromagnetic Power Harvesting Chip Adaptation Based on Available Power Level," filed Feb. 22, 2022, International Application No. PCT/US2022/017304.
Bales, Mark, R., et al., "System and Method of Controlling Unique Identities of Ambient Electromagnetic Power Harvesting Chips," filed Jul. 18, 2022, U.S. Appl. No. 17/867,218.
Bales, Mark, R., et al., "System and Method of Controlling Lifecycles of Ambient Electromagnetic Power Harvesting Chips," filed Feb. 7, 2023, U.S. Appl. No. 18/165,877.
Bales, Mark, R., et al., "System and Method of Controlling Unique Identities of Ambient Electromagnetic Power Harvesting Chips," filed Jun. 1, 2023, International Application No. PCT/US2023/067789.
Bales, Mark, R., et al., "System and Method of Controlling Unique Identities of Ambient Electromagnetic Power Harvesting Chips," filed Jun. 9, 2023, U.S. Appl. No. 18/332,284.
Balmakhtar, Marouane, et al., "Differentiated and Modulated Spectrum Power Radiation Via MIMO and Beamforming Imposed Upon Ambient Electromagnetic Power Harvesting Chips," filed Apr. 3, 2023, U.S. Appl. No. 18/295,075.
Chen, Zhisheng, "Anti-counterfeiting System for Bottled Products," filed May 2, 2022, U.S. Appl. No. 17/734,555.
Chen, Zhisheng, "Anti-counterfeiting System for Bottled Products," filed Mar. 3, 2023, International Application No. PCT/US2023/014517.
Balmakhtar, Marouane, et al., "Device and Method for Controlling a Physical Indicator of an Ambient Electromagnetic Power Harvesting Device," filed Apr. 10, 2023, U.S. Appl. No. 18/298,253.
Marquardt, Ronald, R., et al., "RFID Device with Two-Stage Power Harvesting," filed May 24, 2023, U.S. Appl. No. 18/323,268.
Notice of Allowance and Fee(s) dated Jul. 18, 2024, U.S. Appl. No. 17/161,415, filed Jan. 28, 2021.
Notice of Allowance dated Jul. 30, 2024, U.S. Appl. No. 18/332,284, filed Jun. 9, 2023.
Chen, Zhisheng, "Anti-counterfeiting System for Bottled Products," filed Jul. 12, 2024, U.S. Appl. No. 18/772,096.
Office Action dated Oct. 17, 2023, U.S. Appl. No. 17/165,877, filed Feb. 7, 2023.
Marquardt, Ronald, R., et al., "Multi-tier Identities in an RFID Chip," filed Dec. 20, 2023, U.S. Appl. No. 18/325,936.
Ponnimbaduge, T.D., et al. "Simultaneous Wireless Information and Power Transfer (SWIPT): Recent Advances and Future Challenges." IEEE Communications Surveys & Tutorials, vol. 20, No. 1, pp. 264-302, 2018.
Office Action dated Jun. 30, 2025, U.S. Appl. No. 18/306,934, filed Apr. 25, 2023.

* cited by examiner

AMBIENT ELECTROMAGNETIC POWER HARVESTING DEVICE FOR COLLECTING AND FORWARDING DATA

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some wireless identification (ID) tags respond to a radio frequency (RF) signal from a reader device by emitting an RF response signal. Some wireless identification tags have a battery or other power storage component, while other such tags harvest power from an ambient electromagnetic field. Some wireless identification tags emit an RF response signal in response to a signal comprising predetermined data, while other wireless identification tags emit an RF response signal in response to detecting RF radiation in a predetermined RF frequency band. Some such wireless identification tags are referred to as RFID tags.

SUMMARY

In an embodiment, a collector ambient electromagnetic power harvesting (AEPH) device for collecting and forwarding data is disclosed. The device comprises an antenna; an AEPH circuit coupled to the antenna and configured to receive radio frequency (RF) energy collected by the antenna and convert the RF energy into electrical power; a memory configured to receive electrical power from the AEPH circuit; and a controller coupled to the memory and configured to receive electrical power from the AEPH circuit. The controller is configured to receive first information from a first reporter AEPH device, the first information comprising first data and an identifier (ID) of the first reporter AEPH device, the first information received via the antenna in a first RF signal; store in the memory the first data with an association to the first reporter AEPH device ID; receive second information from a second reporter AEPH device, the second information comprising second data and an ID of the second reporter AEPH device, the information received via the antenna in a second RF signal; store the second data in the memory with an association to the second reporter AEPH device ID; store in the memory a data association between the first data and the second data; receive an interrogation signal via the antenna in a second RF signal; and in response to the interrogation signal, transmit a response via the antenna, the response comprising: the first reporter AEPH device ID and any data in the memory associated with the first reporter AEPH device ID; the second reporter AEPH device ID and any data in the memory associated with the second reporter AEPH device ID; and any data associations stored in the memory, where the associations are between data stored in the memory and associated with the first reporter AEPH device ID and data stored in the memory and associated with the second reporter AEPH device ID.

In another embodiment, a collector AEPH device for collecting and forwarding data is disclosed. The device comprises an antenna; an AEPH circuit coupled to the antenna and configured to receive RF energy collected by the antenna and convert the RF energy into electrical power; a memory configured to receive electrical power from the AEPH circuit; and a controller coupled to the memory and configured to receive electrical power from the AEPH circuit. The controller is configured to transmit via the antenna a first interrogation signal to a reporter AEPH device, the first interrogation signal configured to cause the reporter AEPH device to transmit information; receive the information from the reporter AEPH device, the information comprising data and an ID of the reporter AEPH device, the information received via the antenna in a first RF signal; store the data in the memory with an association to the reporter AEPH device ID; receive a second interrogation signal via the antenna in a second RF signal; and in response to the second interrogation signal, transmit a response via the antenna, the response comprising the reporter AEPH device ID and any data in the memory associated with the reporter AEPH device ID.

In yet another embodiment, a collector AEPH device for collecting and forwarding data is disclosed. The device comprises an antenna; an AEPH circuit coupled to the antenna and configured to receive RF energy collected by the antenna and convert the RF energy into electrical power; a memory configured to receive electrical power from the AEPH circuit; and a controller coupled to the memory and configured to receive electrical power from the AEPH circuit. The controller is configured to receive information from a reporter AEPH device, the information comprising data and an ID of the reporter AEPH device, the information received via the antenna in a first RF signal; store the data in the memory with an association to the reporter AEPH device ID; receive an interrogation signal via the antenna in a second RF signal; and in response to the interrogation signal, transmit a response via the antenna, the response comprising the reporter AEPH device ID and any data in the memory associated with the reporter AEPH device ID.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
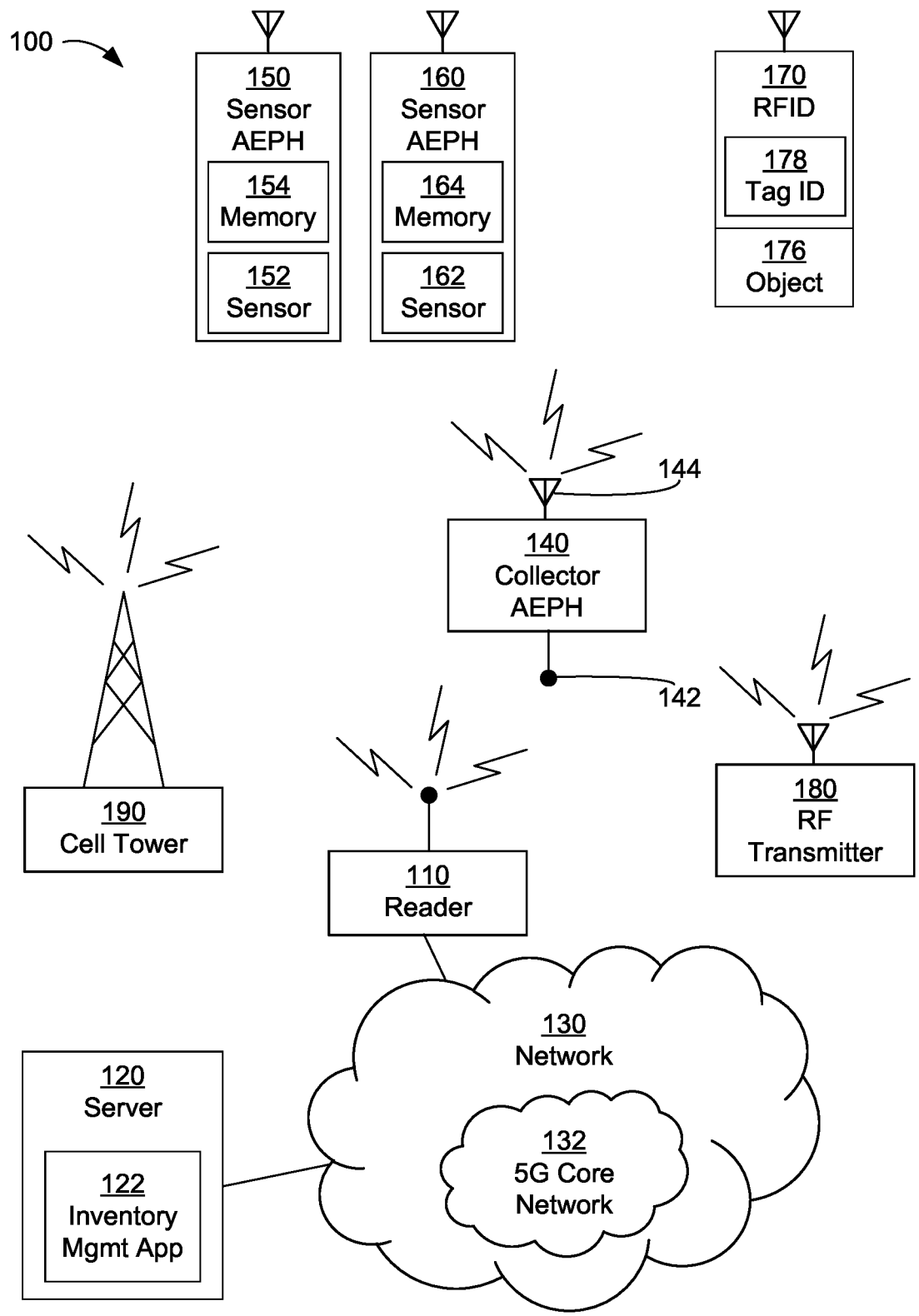
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

An RFID tag may emit an RF response signal in response to an interrogation signal or in response to receiving RF radiation. An RFID tag response typically includes a small amount of preprogrammed or programmable fixed data, such as a tag ID value. A device comprising a sensor and powered using ambient electromagnetic power harvesting (AEPH) may be referred to as a sensor AEPH device. A sensor AEPH device may similarly respond with only a small amount of data, such as a current sensor value and a device ID value.

In some systems, a conventional RFID reader device (or "reader") might be used to read the fixed data from an RFID tag or the current sensor data from a sensor AEPH device. However, in some applications a reader may be unable to read such data due to one or more problems. A first problem might arise when the RFID tags and/or sensor AEPH devices (collectively, "reporter AEPH devices" or "devices") are attached to moving objects and have moved out of range of the reader. A second problem might arise when the devices are stationary but are spread out over a wider area than the reader's RF signals can be transmitted to and/or received from. A third problem might arise when there are a large number of devices to be read: the devices may be too widely dispersed to receive RF energy from the reader, or the process of powering up and reading data from each device cannot be performed in an allotted or available period of time by the reader. A fourth problem might arise when the reader transmits RF energy in a first band of RF frequencies (RF band) and communicates using a first communication protocol, while the devices are powered by RF energy in one or more other RF bands and/or communicate using one or more other communication protocols.

Such technical problems may be solved by a collector AEPH device according to the disclosure that is able to transmit RF signals to RFID tags and/or sensor AEPH devices, receive data sent by the devices, store the received data, and transmit the data at a later time to a reader device. Such a collector AEPH device may add information to the data read from the devices by adding a timestamp to the data as it is stored, or by storing associations between the stored data based on a policy that associates the IDs of one or more RFID tags and/or sensor AEPH devices.

A first use for a collector AEPH device according to the disclosure is in a container having several pallets of objects. Each of the objects may have an individual RFID tag that identifies the object. Some or all of the pallets may have one or more sensor AEPH devices, each device sensing a physical property such as temperature, humidity, rotation (tipping), light exposure, or acceleration (shock). A collector AEPH device may be provided on each of such pallets, to collect data from the RFID tags and/or sensor AEPH devices of that pallet. An RF transmitter in the container may provide RF energy to power the collector AEPH devices present on pallets in the container.

After the pallet is loaded with objects, the collector AEPH may be powered up by an RF energy transmitter and, in turn, send RF energy to power up each of the RFID tags to store the tag ID and any other data from the tags. Additionally, the collector AEPH may interrogate each of the sensor AEPH devices and store initial values for their associated physical properties. The collector AEPH may be provisioned to accept information only from the reporter AEPH devices of its associated pallet. As the pallet is loaded into the container, the collector AEPH device may be powered up by the RF transmitter in the container and begin periodically powering up and reading data from the sensor AEPH devices to develop a historical record of the physical properties that the pallet and its objects are experiencing. The collector AEPH device may store a timestamp along with each measurement received from the sensor AEPH devices.

Based on a policy stored in the collector AEPH device, physical properties that may change more rapidly (such as temperature) may be polled more frequently than properties that may change more slowly (such as humidity). Also based on stored policy, when the collector AEPH device reads data from one sensor AEPH device having a value in a predetermined range (such as a shock above a threshold value), the collector AEPH device may obtain readings from one or more other sensor AEPH devices to establish concurrent values for several physical properties of the objects on the pallet. The collector AEPH device may then store an association between the concurrent readings of data, for example for later historical analysis of readings, timestamps, and/or associations stored in the collector AEPH device.

When the container reaches a waypoint or terminus, a reader device may send an interrogation signal to read some or all of the data stored in the collector AEPH device, perhaps to be uploaded via a network to a server for use by an inventory management application of other function of the network. Where the collector AEPH device has stored associations between data from one or more sensor AEPH devices, the same or a different interrogation signal from the reader may read some or all of the associations. The reader may then send a second signal to the collector AEPH device, causing the device to erase some or all of the stored data and/or associations, freeing memory for later storage of other IDs, data, and associations. The reader may then send such information downloaded from the collector AEPH devices to an inventory control application operating on a network server to be analyzed, for example, to detect problems that occurred during transportation of the objects on the pallets.

A second use for a collector AEPH device according to the disclosure is in collecting data from RFID tags and/or sensor AEPH devices that are geographically separated from each other, for example on electrical utility transformers that are scattered across a city. Such a transformer may be installed with a sensor AEPH device that senses a physical property of the transformer and an RFID tag whose tag ID may be cross-referenced to a location, capacity, electrical grid connectivity and/or other characteristics of the transformer.

A collector AEPH device according to the disclosure may be installed in an electrical utility company vehicle. As the vehicle is driven through the city, the device collects data from any reporter devices whose identifiers it has been provisioned to collect from and stores the data and any related associations in its memory. In some embodiments, such a collector AEPH device may be configured to receive RF energy from nearby cell towers in one or more cellular communication RF bands. When the electrical utility vehicle returns to its home facility (or another facility of the electrical utility), a reader device may power up the collector AEPH device and download the stored data and associations. The reader device may then send such information that has been downloaded from one or more collector AEPH devices to an electrical utility application operating on a network server for analysis or review.

A third use for a collector AEPH device according to the disclosure is in a warehouse or yard or other large area where a single reader device cannot power up or communicate with reporter AEPH devices in the area. In one example, a maximum power that the reader can broadcast may be limited by a communication standard of the RF band it uses to communicate with the devices in the area. As such, the reader's RF signal may not reach all devices in the area. As reader devices will typically be more complex and expensive than collector AEPH devices, the higher cost of installing additional reader devices in the area may be avoided by installing collector AEPH devices in locations spaced away from the reader, where the collector AEPH devices can transmit RF energy to regions of the area not reached by the reader's RF signal. Data from RFID tags and/or sensor AEPH devices in such regions may thus be read and stored by the collector AEPH devices for the reader to later interrogate and upload. The reader may then send such information obtained from the collector AEPH devices to an inventory control application operating on a network server.

Furthermore, the number of reporter AEPH devices in the area may be so large that, even if the reader can communicate directly with them all, the time required to power up and interrogate all the devices is longer than an update period that is useful to the inventory control application. When the collector AEPH devices are obtaining in parallel data from separate subsets of the reporter AEPH devices in the area, the time needed to obtain data from all the devices may be shortened to an update period that is useful to the inventory control application.

A fourth use for a collector AEPH device according to the disclosure is in an application where data is to be read from reporter AEPH devices that use a variety of RF bands and/or communication protocols. Such devices may have been developed at different times and be compliant with different RFID and industrial wireless networking standards. Additionally, such standards are still evolving and almost certainly will specify new RF bands and/or communication protocols in the future. As such, reporter AEPH devices encountered in the present day or in the future in manufacturing, storage, or transportation facilities may use a variety of RF bands and/or communication protocols. In situations where the installed reader devices operate using only one or a few RF bands and/or communication protocols, one or more collector AEPH devices according to the disclosure—which will typically be less complex and therefore less costly than a reader device—may be installed in the facility to act as intermediaries between devices and readers.

In such applications, the collector AEPH device may receive RF energy from the reader device, another RF transmitter, or a nearby cell tower. The reader may communicate with the collector AEPH device in a first RF band using a first communication protocol. The collector AEPH device may, in turn, transmit RF energy in one or more other RF bands, as needed to power up reporter AEPH devices in the facility. The collector AEPH device may also send and receive messages to/from such devices using one or more other communication protocols. Data received from the devices and associations between such data may be stored in the collector AEPH device and read therefrom by the reader device in the first RF band using the first communication protocol. The collector AEPH device may use a first antenna to receive RF energy and communicate with the reader, while using a second antenna to interrogate and communicate with reporter AEPH devices in the facility. The reader may then send such device information obtained from the collector AEPH device to an inventory control application operating on a network server.

Turning now to FIG. 1, a communication system 100 according to the disclosure is described. In an embodiment, the system 100 comprises a reader 110 and a network server 120. These elements of the system 100 communicate wired or wirelessly via a network 130. The network 130 may be one or more public networks, one or more private networks, or a combination thereof. The network 130 may comprise or be coupled to a 5G core network 132 or, in other embodiments, a 4G or 4G Long Term Evolution (LTE) network.

The system further includes a collector AEPH device 140, sensor AEPH devices 150 and 160, and an RFID tag 170. The collector AEPH device 140 communicates with the reader 110, the sensor AEPH devices 150 and 160, and the RFID tag 170 via RF signals. The sensor AEPH devices 150 and 160, and the RFID tag 170 may also communicate with the reader 110 via RF signals.

The sensor AEPH devices 150 and 160 include sensors 152 and 162 and memories 154 and 164, respectively. sensor AEPH devices 150 and 160 may be located near an object, container, wall, pole, or other structure to sense physical characteristics of its surroundings. The RFID tag 170 includes memory storing at least a tag ID 178. The RFID tag 170 may be attached to an object such as a product, container, or pallet.

Each of the sensor AEPH devices 150 and 160 and the RFID tag 170 may receive RF energy from and exchange RF signals with the collector AEPH device 140 and/or the reader 110. Each of the sensor AEPH devices 150 and 160 and the RFID tag 170 may receive RF energy from one of the collector AEPH device 140 and the reader 110 and exchange RF signals with the other.

The collector AEPH device 140 may receive RF energy from and exchange RF signals with the reader 110. The collector AEPH device 140 may receive RF energy and communicate with the reader 110 via a first antenna 142 in a first RF band and transmit RF energy and communicate with one or more of the sensor AEPH devices 150 and 160 and the RFID tag 170 via a second antenna 144 in a second RF band. The collector AEPH device 140 may additionally or alternatively receive RF energy from an RF transmitter 180 or, in a cellular RF band, from a cell tower 190. The reader 110 may receive data and/or associations stored in the collector AEPH device 140 and send such information via the network 130 to an application or network function (such as inventory management application 122) on the network server 120.

In the container example described above, the RF transmitter 180, one or more collector AEPH devices 140, and one or more of each of the sensor AEPH devices 150 and 160 and the RFID tag 170 may be located in a container. The reader 110 may be located at a waypoint or terminus of the container and obtain from the collector AEPH device 140 data collected from the sensor AEPH devices 150 and 160 and/or the RFID tag 170 during transportation of the container to the terminus.

In the example described above where one or more sensor AEPH devices 150 and 160 and/or one or more RFID tags 170 are geographically separated from each other, the collector AEPH device 140 may be located in a vehicle and receive RF energy from a collocated RF transmitter 180 or from a nearby cell tower 190. Whenever the collector AEPH device 140 is receiving such RF energy, it transmits RF energy to and obtains data from any nearby sensor AEPH devices 150 and 160 and/or RFID tags 170 that it has been provisioned to collect data from. The reader 110 may be located anywhere the vehicle may visit and, when in range of the collector AEPH device 140, obtain collected data from the collector AEPH device 140.

In the large warehouse example described above, the reader 110 may be located in a generally centralized location and one or more collector AEPH devices 140 located within RF energy range of the reader 110. One or more sensor AEPH devices 150 and 160 and/or one or more RFID tags 170 may be located in the warehouse and receive RF energy from either the collector AEPH device 140 or the reader 110 and exchange RF signals with either the collector AEPH device 140 or the reader 110. The reader 110 may obtain sensor data and/or tag IDs directly from the one or more sensor AEPH devices 150 and 160 and/or one or more RFID tags 170 and/or indirectly from the one or more collector AEPH devices 140.

The multi-RF band and/or multi-communication protocol example described above is not tied to location or motion of the system components. As such, collector AEPH devices 140 may be used to translate RF bands and or communication protocols between the readers 110 and the AEPH devices 150 and 160 or RFID tags 170 in any of the three examples just discussed.

Figure 2:
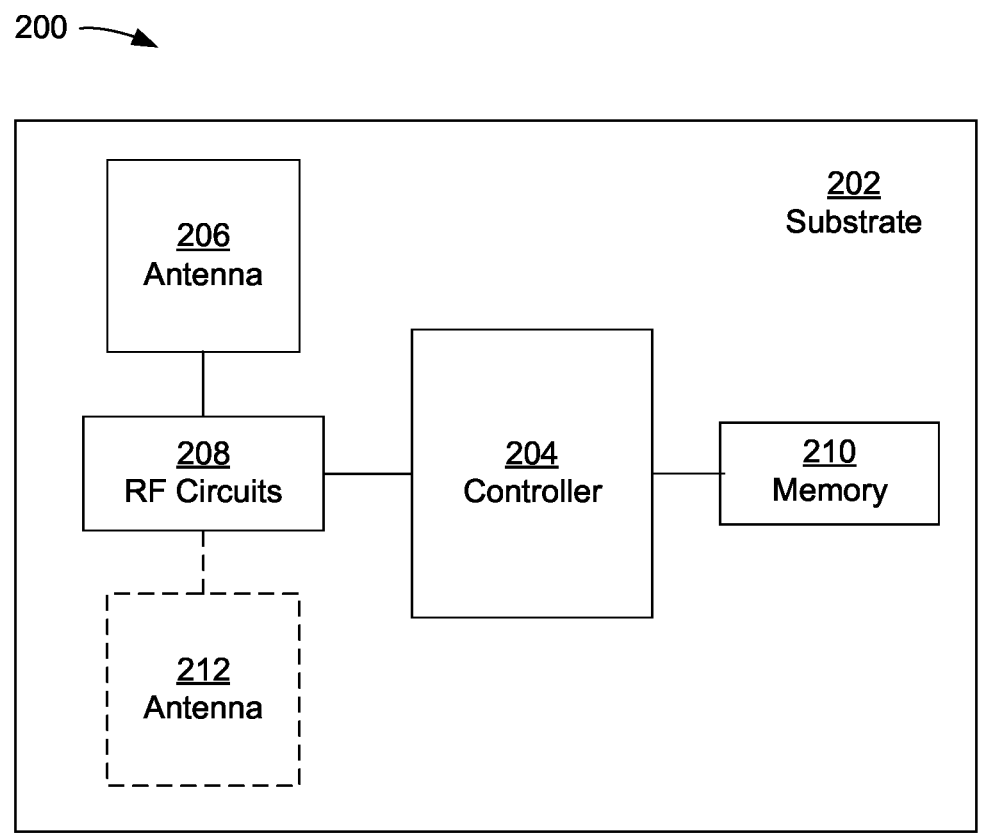
FIG. 2 is a block diagram of a collector AEPH device according to an embodiment of the disclosure.

FIG. 2 is a block diagram of a collector AEPH device 200 according to an embodiment of the disclosure. The device 200 comprises a substrate 202, having fabricated thereon a controller 204, an antenna 206, RF circuits 208, and a memory 210. In some embodiments, the substrate 202 further includes a second antenna 212.

The RF circuits 208 are configured to receive RF energy in one or more predetermined RF bands from the antenna 206. In a process referred to as ambient electromagnetic power harvesting, AEPH circuits of the RF circuits 208 convert the RF energy to electrical power for the controller 204, the memory 210, and other circuits of the device 200.

The RF circuits 208 also convert RF energy from the antenna 206 in the one or more predetermined RF bands to a signal comprising encoded information, which is sent to the controller 204. The RF circuits 208 also operate in the opposite direction to convert encoded information received from the controller 204 into RF signals in the one or more predetermined RF bands for transmission via the antenna 206.

Received information may include data and/or sender ID. The controller 204 may store the data and/or sender ID, as well as an association between the two in the memory 210. The controller 204 may include (or be coupled to) a clock circuit and store a timestamp with the data, ID, and/or association.

In some embodiments, the device 200 further comprises a second antenna 212. In such embodiments, the device 200 may be configured to communicate with external devices in a plurality of RF bands for which physical properties of the antenna 212 make it more efficient or more sensitive than the antenna 206. In such embodiments, the RF circuits 208 may include circuits configured for both the RF band(s) of the antenna 206 and the RF band(s) of the antenna 212. Either or both of the antenna 206 or the antenna 212 may be coupled to the AEPH circuitry of the RF circuits 208.

The controller 204 may be configured to communicate via either or both of the antenna 206 or the antenna 212 using one or more communication protocols. The controller 204 may communicate with sensor AEPH devices and/or RFID tags using one or more of International Organization for Standardization (ISO) standard ISO11784, joint ISO and International Electrotechnical Commission (IEC) standard ISO/IEC 18000, and/or Electronic Product Code (EPC) standard EPC Gen2. The controller 204 may communicate with a reader device using one or more of Zigbee, WiFi, and/or Bluetooth RF bands and protocols.

Figure 3A:
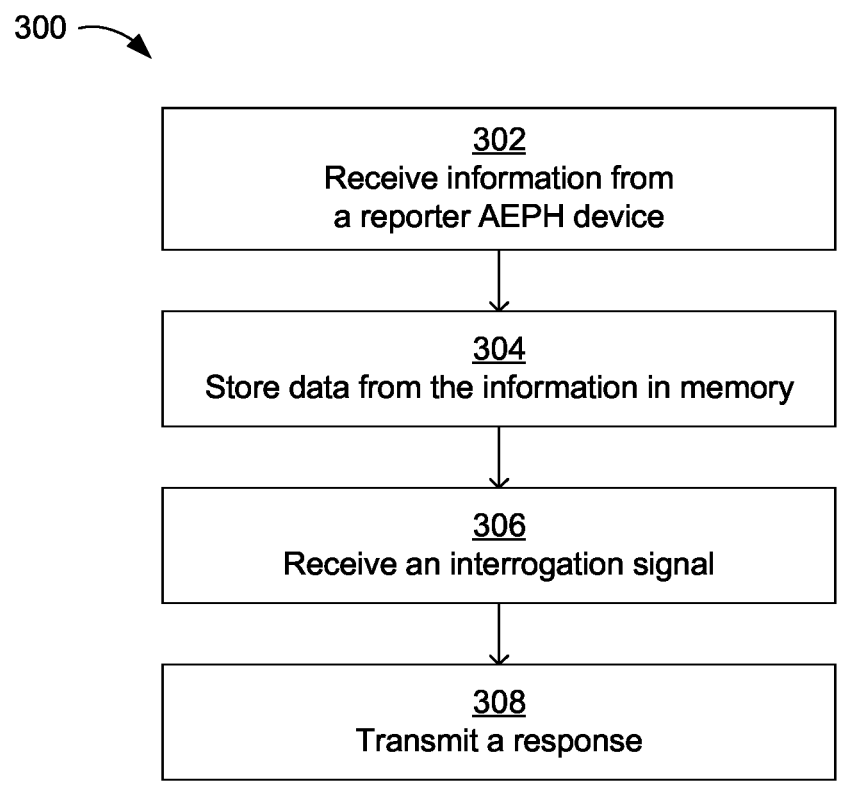
FIG. 3A is a flow chart of a first method according to an embodiment of the disclosure.
Figure 3B:
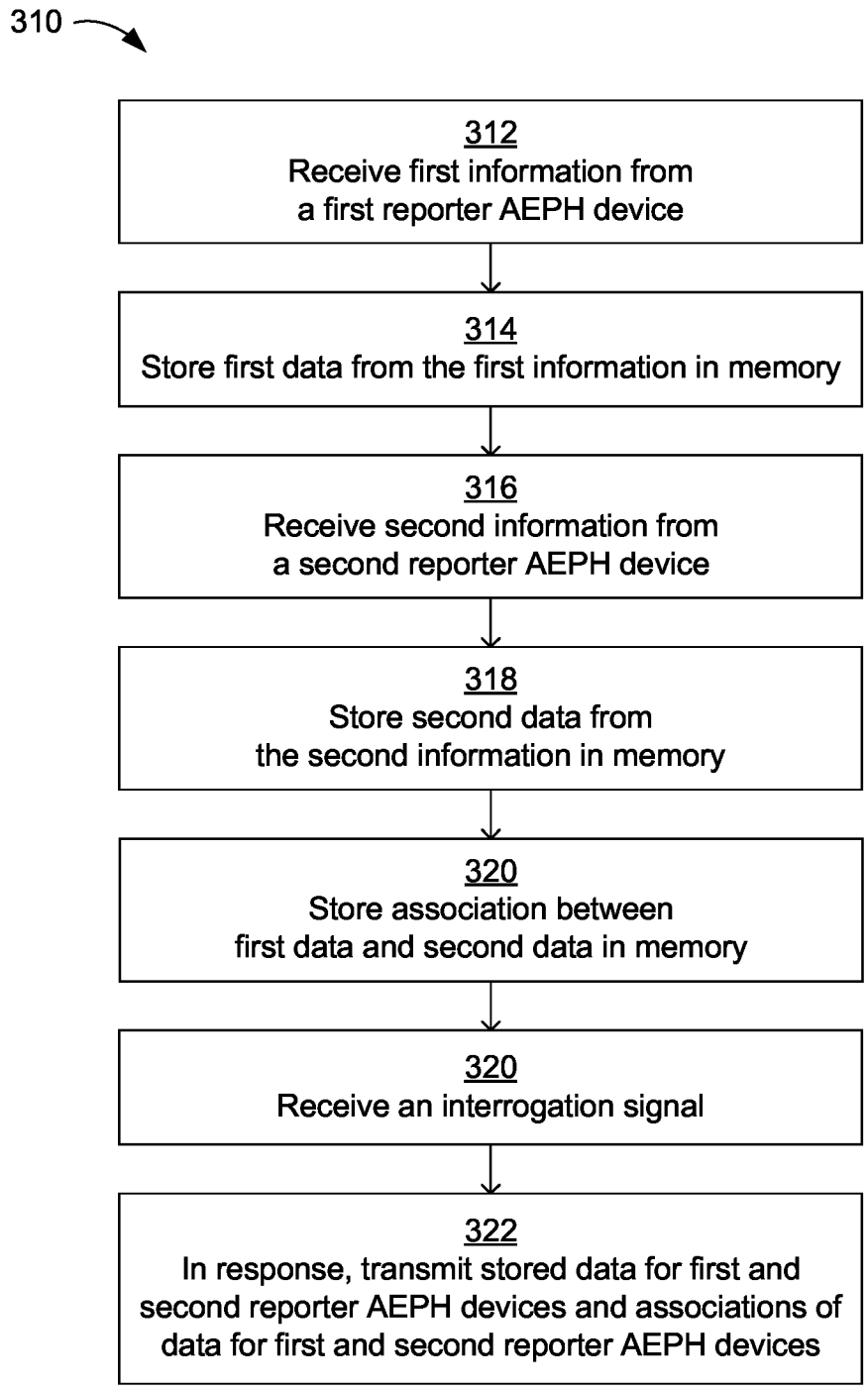
FIG. 3B is a flow chart of a second method according to an embodiment of the disclosure.
Figure 3C:
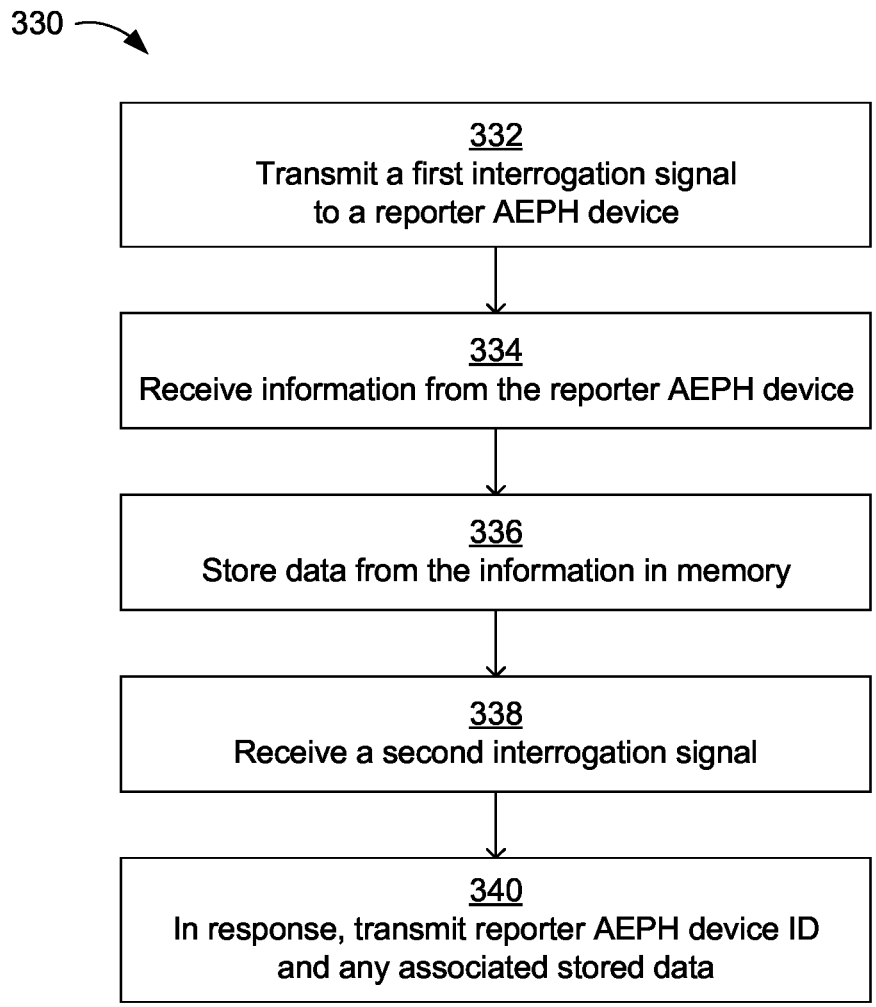
FIG. 3C is a flow chart of a third method according to an embodiment of the disclosure.

FIGS. 3A, 3B, and 3C are flow charts of methods 300, 310, and 330, respectively, according to embodiments of the disclosure. The methods illustrate processes that may be implemented within the collector AEPH device 200. The methods are illustrated as logical flow graphs, each operation of which represents a sequence of operations that can be implemented in hardware, software, or a combination thereof.

FIG. 3A is a flow chart of a first method 300 according to an embodiment of the disclosure. In step 302, the controller 204 receives a first RF signal via the antenna 206 or 212, the first RF signal comprising information from a reporter AEPH device, such as the RFID tag 170 or one of the sensor AEPH devices 150 or 160. The information includes data and an ID of the reporter AEPH device. In step 304, the controller 204 stores the data in the memory 210 with an association to the reporter AEPH device ID.

In step 306, via the antenna 206 or 212, the controller 204 receives a second RF signal comprising an interrogation signal. In response, in step 308 the controller 204 transmits a response via the antenna 206 or 212, the response including the reporter AEPH device ID and any data in the memory 210 that is associated with the reporter AEPH device ID.

In some embodiments, the RF circuits 208 convert RF energy received from a reader device into electrical power for the collector AEPH device 200. In other embodiments, the collector AEPH device 200 includes both antennas 206 and 212, one of which is used for receiving the first RF signal and the other of which is used for the interrogation signal and response.

In various embodiments, the first and second RF signals may be in different RF bands and/or the information may be received and the response transmitted using different communication protocols. In some embodiments, the controller 204 may receive second data from the reporter AEPH device and, in response to interrogation signal, transmit the reporter AEPH device ID and both the first data and the second data.

FIG. 3B is a flow chart of a second method 310 according to an embodiment of the disclosure. In step 312, the controller 204 receives a first RF signal via the antenna 206 or 212, the first RF signal comprising first information from a first reporter AEPH device. The information includes first data and an ID of the first reporter AEPH device. In step 314, the controller 204 stores the first data in the memory 210 with an association to the first reporter AEPH device ID.

In step 316, the controller 204 receives a second RF signal via the antenna 206 or 212, the second RF signal comprising second information from a second reporter AEPH device. The information includes second data and an ID of the second reporter AEPH device. In step 318, the controller 204 stores the second data in the memory 210 with an association to the second reporter AEPH device ID. In step 320, the controller 204 stores in the memory 210 a data association between the first data and the second data.

In step 320, via the antenna 206 or 212, the controller 204 receives a second RF signal comprising an interrogation signal. In response, in step 322 the controller 204 transmits a response via the antenna 206 or 212, the response including the first reporter AEPH device ID and any data in the memory 210 that is associated with the first reporter AEPH device ID, the second reporter AEPH device ID and any data in the memory 210 that is associated with the second reporter AEPH device ID, and any data associations that are stored in the memory 210, where the associations are between data that is stored in the memory 210 and associated with the first reporter AEPH device ID and data that is stored in the memory 210 and associated with the second reporter AEPH device ID.

In some embodiments, the controller 204 stores individual timestamps in the memory 210 with one or both of (i) data that is stored in the memory 210 and associated with a reporter AEPH device ID and (ii) data associations that are stored in the memory 210. In some embodiments, the controller 204 transmits a second interrogation signal to the first reporter AEPH device, where the second interrogation signal is configured to cause the first reporter AEPH device to transmit the first information.

In some embodiments, the controller 204 reads from the memory 210 a stored policy that associates the first reporter AEPH device ID and the second reporter AEPH device ID and the controller 204 stores a data association between the first data and the second data based on the stored policy. In some such embodiments, upon receiving the first information, the controller 204, based on the stored policy, transmits a third interrogation signal to the second reporter AEPH device, where the third interrogation signal is configured to cause the second reporter AEPH device to transmit the second information. In some embodiments, the controller 204 reads from the memory 210 a stored policy that includes first and second time intervals and the controller 204 periodically interrogates the first reporter AEPH device based upon the first time interval and periodically interrogates the second reporter AEPH device based upon the second time interval.

FIG. 3C is a flow chart of a third method 330 according to an embodiment of the disclosure. In step 332, the controller 204 transmits a first interrogation signal to a reporter AEPH device via the antenna 206 or 212. The first interrogation signal is configured to cause the reporter AEPH device to transmit information. In step 334, the controller 204 receives via the antenna 206 or 212 a first RF signal that includes the information from the reporter AEPH device. The information includes data and an ID of the reporter AEPH device. In step 336, the controller 204 stores the data in the memory 210 with an association to the reporter AEPH device ID.

In step 338, via the antenna 206 or 212, the controller 204 receives a second RF signal comprising a second interrogation signal. In response, in step 340 the controller 204 transmits a response via the antenna 206 or 212. The response includes the reporter AEPH device ID and any data in the memory 210 that is associated with the reporter AEPH device ID.

In some embodiments, the RF circuits 208 convert RF energy received from a reader device into electrical power for the collector AEPH device 200. In other embodiments, the collector AEPH device 200 includes both antennas 206 and 212, one of which is used for receiving the second RF signal and the response and the other of which is used for the interrogation signal and response. In various embodiments, the first and second RF signals may be in different RF bands and/or the information may be received and the response transmitted using different communication protocols.

In some embodiments, the controller 204 transmits a third interrogation signal to a second reporter AEPH device via the antenna 206 or 212. The third interrogation signal is configured to cause the second reporter AEPH device to transmit second information. In such embodiments, the controller 204 receives a third RF signal that includes the second information, which includes second data and an ID of the second reporter AEPH device. The controller 204 stores the second data in the memory 210 with an association to the second reporter AEPH device ID. In such embodiments, the response further comprises the second reporter AEPH device ID and any data in the memory associated with the second reporter AEPH device ID.

In some such embodiments, the controller 204 reads from the memory 210 a stored policy that associates the first reporter AEPH device ID and the second reporter AEPH device ID and, based on the stored policy, stores in the memory 210 a data association between the first data and the second data. In some such embodiments, based on the stored policy, the response further comprises any data associations stored in the memory 210, where the associations are between data stored in the memory 210 and associated with the first reporter AEPH device ID and data stored in the memory 210 with an association to the second reporter AEPH device ID.

Figure 4:
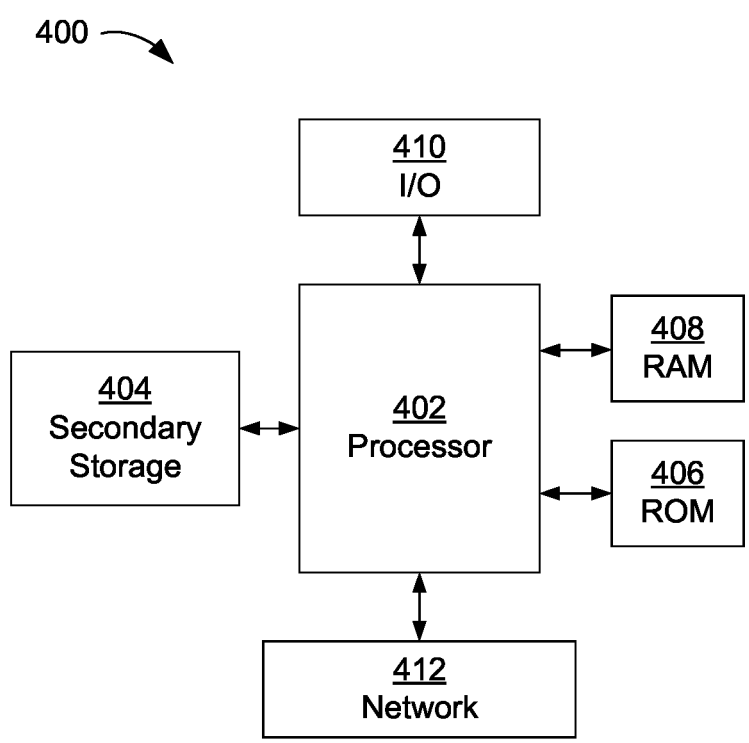
FIG. 4 is a block diagram of a hardware architecture of a device according to an embodiment of the disclosure.

FIG. 4 is a block diagram of a hardware architecture of a device 400 according to an embodiment of the disclosure. The device 400 may be suitable for implementing at least portions of the collector AEPH device 140, the collector AEPH device 200, and the server 120. The device 400 includes a processor 402 (which may be referred to as a central processor unit or CPU) that is in communication with memory devices including secondary storage 404, ROM 406, and RAM 408. The processor 402 is also in communication with input/output (I/O) devices 410, and network connectivity devices 412 (for example, in the collector AEPH device 140 or the collector AEPH device 200, the RF circuits 208). The processor 402 may be implemented as one or more CPU chips.

The controller 204 comprises any or all of the processor 402, secondary storage 404, ROM 406, RAM 408, and I/O devices 410. The memory 210 comprises any or all of the secondary storage 404 and RAM 408.

It is understood that by programming and/or loading executable instructions onto the device 400, at least one of the CPU 402, the RAM 408, and the ROM 406 are changed, transforming the device 400 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 400 is turned on or booted (for example, by receiving electrical power from AEPH circuits of the RF circuits 208), the CPU 402 may execute a computer program or application. For example, the CPU 402 may execute software or firmware stored in the ROM 406 or stored in the RAM 408. In some cases, on boot and/or when the application is initiated, the CPU 402 may copy the application or portions of the application from the secondary storage 404 to the RAM 408 or to memory space within the CPU 402 itself, and the CPU 402 may then execute instructions that the application is comprised of. During execution, an application may load instructions into the CPU 402, for example load some of the instructions of the application into a cache of the CPU 402. In some contexts, an application that is executed may be said to configure the CPU 402 to do something, e.g., to configure the CPU 402 to perform the function or functions promoted by the subject application. When the CPU 402 is configured in this way by the application, the CPU 402 becomes a specific purpose computer or a specific purpose machine.

The secondary storage 404 is used for non-volatile storage of data and as an over-flow data storage device if RAM 408 is not large enough to hold all working data. Secondary storage 404 may be used to store programs which are loaded into RAM 408 when such programs are selected for execution. The ROM 406 is used to store instructions and perhaps data which are read during program execution. ROM 406 is a non-volatile memory device which typically has a small memory capacity relative to the larger memory capacity of secondary storage 404. The RAM 408 is used to store volatile data and perhaps to store instructions. Access to both ROM 406 and RAM 408 may be faster than to secondary storage 404. The secondary storage 404, the RAM 408, and/or the ROM 406 may be referred to in some contexts as computer readable storage media and/or non-transitory computer readable media.

The processor 402 executes instructions, codes, computer programs, scripts which it accesses from the secondary storage 404, the ROM 406, or the RAM 408. While only one processor 402 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 404, the ROM 406, and/or the RAM 408 may be referred to in some contexts as non-transitory instructions and/or non-transitory information.

In some contexts, the secondary storage 404, the ROM 406, and the RAM 408 may be referred to as a non-transitory computer readable medium or a computer readable storage media. A dynamic RAM embodiment of the RAM 408, likewise, may be referred to as a non-transitory computer readable medium in that while the dynamic RAM receives electrical power and is operated in accordance with its design, for example during a period of time during which the device 400 is powered up and operational, the dynamic RAM stores information that is written to it. Similarly, the processor 402 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A collector ambient electromagnetic power harvesting (AEPH)
    device for collecting and forwarding data, the device comprising:
    an antenna;
    an AEPH circuit coupled to the antenna and configured to receive radio frequency (RF) energy collected by the antenna and convert the RF energy into electrical power;
    a memory configured to receive electrical power from the AEPH circuit; and
    a controller coupled to the memory and configured to receive electrical power from the AEPH circuit,
    wherein the controller is configured to:
        receive first information from a first reporter AEPH device, the first information comprising first data and an identifier (ID) of the first reporter AEPH device, the first information received via the antenna in a first RF signal;
        store in the memory the first data with an association to the first reporter AEPH device ID;
        receive second information from a second reporter AEPH device, the second information comprising second data and an ID of the second reporter AEPH device, the information received via the antenna in a second RF signal;
        store the second data in the memory with an association to the second reporter AEPH device ID;
        store in the memory a data association between the first data and the second data;
        receive an interrogation signal via the antenna in a third RF signal; and
        in response to the interrogation signal, transmit a response via the antenna, the response comprising: the first reporter AEPH device ID and any data in the memory associated with the first reporter AEPH device ID;

the second reporter AEPH device ID and any data in the memory associated with the second reporter AEPH device ID; and any data associations stored in the memory, where the associations are between data stored in the memory and associated with the first reporter AEPH device ID and data stored in the memory and associated with the second reporter AEPH device ID.

2. The collector AEPH device of claim 1, wherein the controller is configured to store in memory individual timestamps with at least one of (i) data stored in the memory with an association to a reporter AEPH device ID and (ii) data associations stored in the memory.

3. The collector AEPH device of claim 1, wherein the collector transmits a second interrogation signal to the first reporter AEPH device, the second interrogation signal configured to cause the first reporter AEPH device to transmit the first information.

4. The collector AEPH device of claim 1, wherein the controller is configured to read from the memory a stored policy that associates the first reporter AEPH device ID and the second reporter AEPH device ID and store in the memory a data association between the first data and the second data based on the stored policy.

5. The collector AEPH device of claim 4, wherein the controller is configured to, upon receiving the first information, based on the stored policy, transmit a third interrogation signal to the second reporter AEPH device, the third interrogation signal configured to cause the second reporter AEPH device to transmit the second information.

6. The collector AEPH device of claim 1, wherein the controller is configured to read from the memory a stored policy comprising first and second time intervals and periodically interrogate the first reporter AEPH device based upon the first time interval and periodically interrogate the second reporter AEPH device based upon the second time interval.

7. A collector ambient electromagnetic power harvesting (AEPH) device for collecting and forwarding data, the device comprising:
an antenna;
an AEPH circuit coupled to the antenna and configured to receive radio frequency (RF) energy collected by the antenna and convert the RF energy into electrical power;
a memory configured to receive electrical power from the AEPH circuit; and
a controller coupled to the memory and configured to receive electrical power from the AEPH circuit,
wherein the controller is configured to:
transmit via the antenna a first interrogation signal to a first reporter AEPH device, the first interrogation signal configured to cause the reporter AEPH device to transmit first information;
receive the first information from the first reporter AEPH device, the first information comprising first data and an identifier (ID) of the first reporter AEPH device, the first information received via the antenna in a first RF signal;
store the first data in the memory with an association to the first reporter AEPH device ID;
transmit via the antenna a second interrogation signal to a second reporter AEPH device, the second interrogation signal configured to cause the second reporter AEPH device to transmit second information;

receive the second information from the second reporter AEPH device, the second information comprising second data and an ID of the second reporter AEPH device, the second information received via the antenna in a second RF signal;
store in the memory the second data with an association to the second reporter AEPH device ID;
store in the memory a data association between the first data and the second data;
receive a third interrogation signal via the antenna in a third RF signal; and
in response to the third interrogation signal, transmit a response via the antenna, the response comprising the first reporter AEPH device ID and any data in the memory associated with the first reporter AEPH device ID, the second reporter AEPH device ID and any data in the memory associated with the second reporter AEPH device ID, and any stored data associations between any data stored in the memory associated with at least one of the first reporter AEPH device ID or the second report AEPH device ID.

8. The collector AEPH device of claim 7, wherein the collector AEPH device is configured to receive the RF energy from a reader device.

9. The collector AEPH device of claim 7, wherein the antenna is a first antenna and the collector AEPH device further comprises a second antenna, wherein the third RF signal, comprising the RF energy and the third interrogation signal, is received and the response is transmitted via the first antenna, and the first interrogation signal is transmitted and the response is received via the second antenna.

10. The collector AEPH device of claim 7, wherein the third interrogation signal is received and the response is transmitted in a first RF band, and the first interrogation signal is transmitted and the first information is received in a second RF band.

11. The collector AEPH device of claim 7, wherein the third interrogation signal is received and the response is transmitted in a first communication protocol, and the first interrogation signal is transmitted and the first information is received in a second communication protocol.

12. The collector AEPH device of claim 7, wherein the controller is configured to read from the memory a stored policy that associates the first reporter AEPH device ID and the second reporter AEPH device ID, and wherein the data association between the first data and the second data is stored in the memory based on the stored policy.

13. The collector AEPH device of claim 12, wherein the response is based on the stored policy.

14. A collector ambient electromagnetic power harvesting (AEPH) device for collecting and forwarding data, the device comprising:
an antenna;
an AEPH circuit coupled to the antenna and configured to receive radio frequency (RF) energy collected by the antenna and convert the RF energy into electrical power;
a memory configured to receive electrical power from the AEPH circuit; and
a controller coupled to the memory and configured to receive electrical power from the AEPH circuit,
wherein the controller is configured to:
receive first information from a first reporter AEPH device, the first information comprising first data and an identifier (ID) of the first reporter AEPH device, the first information received via the antenna in a first RF signal;

store the first data in the memory with an association to the first reporter AEPH device ID;

receive second information from a second reporter AEPH device, the second information comprising second data and an ID of the second reporter AEPH device, the second information received via the antenna in a second RF signal;

store the second data in the memory with an association to the second reporter AEPH device ID;

store in the memory a data association between the first data and the second data based on an association between the first reporter AEPH device ID and the second reporter AEPH device ID;

receive an interrogation signal via the antenna in a third RF signal; and in response to the interrogation signal, transmit a response via the antenna, the response comprising the first reporter AEPH device ID and the first data, the second reporter AEPH device ID and the second data, and the data association between the first data and the second data.

15. The collector AEPH device of claim 14, wherein the collector AEPH device is configured to receive the RF energy from a reader device.

16. The collector AEPH device of claim 14, wherein the antenna is a first antenna and the collector AEPH device further comprises a second antenna, wherein the interrogation signal is received and the response is transmitted via the first antenna, and the first information is received via the second antenna.

17. The collector AEPH device of claim 14, wherein the interrogation signal is received and the response is transmitted in a first RF band, and the first information is received in a second RF band.

18. The collector AEPH device of claim 14, wherein the interrogation signal is received and the response is transmitted in a first communication protocol, and the first information is received in a second communication protocol.

* * * * *